United States Patent

Dean

(10) Patent No.: US 8,285,401 B2
(45) Date of Patent: Oct. 9, 2012

(54) DISCRETE FOURIER TRANSFORM (DFT) ANALYSIS FOR APPLICATIONS USING ITERATIVE TRANSFORM METHODS

(75) Inventor: Bruce H. Dean, New Market, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 494 days.

(21) Appl. No.: 12/549,898

(22) Filed: Aug. 28, 2009

(65) Prior Publication Data

US 2011/0054693 A1    Mar. 3, 2011

(51) Int. Cl.
| | |
|---|---|
| G05B 19/18 | (2006.01) |
| G06K 9/76 | (2006.01) |
| G06K 9/36 | (2006.01) |
| G02B 5/32 | (2006.01) |
| G02B 27/46 | (2006.01) |
| G02B 27/42 | (2006.01) |
| G02B 5/18 | (2006.01) |

(52) U.S. Cl. .......... 700/59; 382/210; 382/276; 382/280; 359/16; 359/558; 359/559

(58) Field of Classification Search ................ 700/59; 382/210, 276, 280; 359/16, 558, 559
See application file for complete search history.

(56) References Cited

U.S. PATENT DOCUMENTS

| | | | | |
|---|---|---|---|---|
| 6,766,062 B1 * | 7/2004 | Donoho et al. | ............... | 382/240 |
| 7,039,252 B2 * | 5/2006 | Ludwig | ................ | 382/280 |
| 7,457,084 B2 * | 11/2008 | Matsuda et al. | ........... | 360/264.7 |
| 7,505,609 B1 * | 3/2009 | Hartman et al. | .............. | 382/103 |
| 7,602,997 B2 * | 10/2009 | Young | ............... | 382/299 |
| RE42,187 E * | 3/2011 | Ludwig | ................ | 382/280 |

* cited by examiner

Primary Examiner — Ronald Hartman, Jr.

(57) ABSTRACT

According to various embodiments, a method is provided for determining aberration data for an optical system. The method comprises collecting a data signal, and generating a pre-transformation algorithm. The data is pre-transformed by multiplying the data with the pre-transformation algorithm. A discrete Fourier transform of the pre-transformed data is performed in an iterative loop. The method further comprises back-transforming the data to generate aberration data.

18 Claims, 2 Drawing Sheets

DISCRETE FOURIER TRANSFORM (DFT) ANALYSIS FOR APPLICATIONS USING ITERATIVE TRANSFORM METHODS

STATEMENT OF GOVERNMENT INTEREST

The invention described herein was made by an employee of the United States Government and may be manufactured and used by or for the Government of the United States of America for governmental purposes without the payment of any royalties thereon or therefor.

FIELD

The present invention relates generally to digital signal processing, and more particularly to a faster method of performing the discrete Fourier transform and the fast Fourier transform, in applications using iterative transform methods.

BACKGROUND

Fourier analysis is a family of mathematical techniques based on decomposing signals into sinusoids. The discrete Fourier transform ("DFT") is the family member that can be used with digital signals and digital signal processing. A DFT can decompose a sequence or set of data values into components of different frequencies. In calculating each of the components (real and imaginary pairs) of the Fourier transform, one must use all N vectors of the sampled set. As is known in the art, the total computation time of the DFT is the total number of operations N×N, or $N^2$. While the DFT is useful in many fields, computing it directly from the definition can often be too slow to be practical.

A fast Fourier transform ("FFT") is a way to compute the same result as the DFT, more quickly. Through the use of interlace decomposition, an FFT can compute approximately the same result as the DFT in N log N operations. Still this number of computations can often be slow and take up large amounts of processing time. A need exists to overcome the deficiencies of the DFT and the FFT.

SUMMARY

According to various embodiments, the present teachings provide an improved method for performing the discrete Fourier transform. By pre-transforming the data, performing the DFT, and then back transforming the data, the method described herein can compute the DFT in a total of N operations. The present teachings describe the matrix form of the discrete Fourier transform ("DFT") and the hybrid-index notation of Schouten is introduced as a method for performing the DFT calculations in a complex vector space. The similarity transformation is presented in detail for a multi-dimensional DFT example (4×4 array size) and then applied to illustrate how the DFT can be carried out in a diagonal basis using the hybrid-index notation of Schouten.

According to various embodiments, an optical system is provided that is adapted to collect optical data, for example, imaging data. The optical system can comprise a signal processor configured to carry out the DFT calculations described herein. By "pre-transforming" the data once at the beginning of the calculation, and "back-transforming" the data at the end of the calculation, the DFT can be implemented as a one-dimensional vector product using just N operations, compared to the N log N operations needed by the fast Fourier transform ("FFT") counterpart. The "pre-" and "back-" transforms are implemented using the DFT similarity transform and the inverse of the DFT similarity transform. In some embodiments, the calculation can be implemented using arbitrary frequency spacings.

According to various embodiments of the present teachings, a method is provided for determining aberration data for an optical system. An optical system can be configured to perform the method. The optical system can comprise a signal processor, for example, one or more computers. The optical system can further comprise a control unit that can be operably linked to the signal processor. The optical system can be launched into space prior to collecting data, for example, prior to collecting intensity data. The optical system can comprise a telescope. In some embodiments, the telescope can comprises one or more optical components, and at least one of the optical components can be configured to move. The optical components can comprise at least one mirror, lens, servo mechanism, prism, beam splitter, photomultiplier tube, detector, or a combination thereof. The control unit can be configured to control the movement of at least one of the optical components. The method can comprise collecting data generated by the optical system, for example, intensity data, light imaging data, thermal imaging data, or another type of data.

According to various embodiments, the method can comprise performing various calculations on the data. For example, a similarity transform, and an inverse of the similarity transform, can each be calculated based upon the data. In some embodiments, a discrete Fourier transform matrix can be calculated on the data. The method can comprise pre-transforming the data using the similarity transform and the inverse of the similarity transform to generate pre-transformed data. The method can perform an iterative transform operation on the pre-transformed data using the processor, by multiplying the pre-transformed data by the discrete Fourier transform matrix, for example, for a predetermined number of times, to generate iteratively transformed data. The method can back-transform the data using the signal processor, by multiplying the data by either the similarity transform or the inverse of the similarity transform, to form aberration data. The aberration data can be outputted to a user, for example, on a display such as a graph, and/or the aberration data can be printed out.

In some embodiments, the method can comprise generating correction data based upon the aberration data. In some embodiments, the optical system can be adjusted using the correction data, for example, an adjustment can be made to the orientation of an optical component under the control of the control unit. The aberration data can pertain to at least one of a piston aberration, a tip aberration, a tilt aberration, a defocus aberration, an astigmatism aberration, a coma aberration, a spherical aberration, and a trefoil aberration.

In some embodiments, the iterative transform operation can comprise iteratively performing a phase retrieval operation on the pre-transformed data. The method can further comprise generating phase correction data and the optical system can be adjusted using the phase correction data, for example, to overcome phase errors and provide an image that is in greater focus. For example, the correction data can comprise information that can adjust one or more optical components of the optical system to thereby compensate for aberrations in the data.

According to various embodiments, the signal processor can be configured to generate correction data based upon the aberration data. The control unit can be configured to adjust the optical system based upon the correction data. The optical system can comprise a telescope, and the telescope can comprise one or more optical components. The one or more optical components can comprise at least one of a mirror, lens, servo mechanism, prism, beam splitter, photomultiplier tube, detector, or a combination thereof. In some embodiments, the optical system can comprise a focusing system. In some embodiments, the optical system can comprise a beam-generating device, such as a laser beam generating device, and a sighting system for the beam generating device.

BRIEF DESCRIPTION OF THE DRAWINGS

The present teachings will be described with reference to the accompanying drawings, in which like elements are referenced with like numbers. The drawings are intended to be exemplary only and not to limit the present teachings.

DETAILED DESCRIPTION OF THE PRESENT INVENTION

According to various embodiments, the discrete Fourier transform calculation can be applied in diagonal form. The diagonal form introduces a transformation of basis by an application of the similarity transform of linear algebra. In doing so, a more efficient implementation of the DFT for applications using iterative transform methods can be achieved. The present teachings can be used in the field of signal processing, for example, the method can be used with phase retrieval for determining the phase error or aberrations in an optical system.

Performance of optical systems, such as those found in cameras, telescopes, microscopes, and other systems for the collection of images, can often be improved by actively correcting for aberrations in the optical system. Wavefront sensing is a technique that can be used to obtain phase information from a wavefront to recover such aberrations. According to various embodiments of the present teachings, a method is provided for determining aberration data for an optical system. An optical system configured to perform the method is also provided. The optical system can comprise a signal processor. The optical system can comprise a telescope. The optical system can further comprise a control unit that can be operably linked to the signal processor, and, for example, an optical component of a telescope. The optical system can be launched into space prior to collecting intensity data. In some embodiments, the telescope can comprise one or more optical components, and at least one of the optical components can be configured to move. The optical components can comprise at least one mirror, lens, servo mechanism, prism, beam splitter, photomultiplier tube, detector, camera, or a combination thereof. The control unit can be configured to control movement of at least one of the optical components. The method can comprise collecting data generated by the optical system, for example, intensity data, light imaging data, thermal imaging data, or another type of data.

According to various embodiments, the method can comprise performing various calculations on collected data. For example, a similarity transform and an inverse of the similarity transform can be calculated based upon the data. In some embodiments, a discrete Fourier transform matrix can be calculated on the data. The method can comprise pre-transforming the data using the similarity transform and the inverse of the similarity transform to generate pre-transformed data. The method can perform an iterative transform operation on the pre-transformed data using the processor, by multiplying the pre-transformed data by the discrete Fourier transform matrix, a predetermined amount of times, to generate iteratively transformed data. The method can back-transform the data using the processor, by multiplying the data by one of the similarity transform and the inverse of the similarity transform, to form aberration data. The aberration data can be outputted to a user, for example, on a display such as a graphical display.

In some embodiments, the method comprises generating correction data based upon the aberration data, and adjusting the optical system using the correction data. The aberration data can pertain to at least one of a piston aberration, a tip aberration, a tilt aberration, a defocus aberration, an astigmatism aberration, a coma aberration, a spherical aberration, and a trefoil aberration. In some embodiments, the iterative transform operation can comprise iteratively performing a phase retrieval operation on the pre-transformed data. The method can further comprise generating phase correction data. The optical system can be adjusted using the phase correction data, to thereby overcome phase errors and provide an image that is in greater focus. For example, the correction data can comprise information that can adjust one or more optical components of the optical system to thereby overcome for aberrations in the data.

According to various embodiments, the signal processor can be configured to generate correction data based upon the aberration data. The control unit can be configured to adjust the optical system based upon the correction data. The optical system can comprise a telescope, wherein the telescope can comprise one or more optical components. The one or more optical components can comprise at least one of a mirror, lens, servo mechanism, prism, beam splitter, photomultiplier tube, detector, camera, or a combination thereof. In some embodiments, the optical system can comprise a focusing system. In some embodiments, the optical system can comprise a beam-generating device such as a laser beam-generating device, and a sighting system for the beam-generating device.

According to various embodiments, phase retrieval is just one example where the method of the present teachings can be applied but it will be appreciated that the method of the present invention is not limited to phase retrieval and can instead be utilized in various digital signal processing methods. The method can be used anytime a transform of data from the time (or spatial) domain to the frequency domain is desired. The method of the present teachings can also be used anytime a transform of data from a frequency domain to the time (or spatial) domain is desired. In some embodiments, the method of the present teachings can be utilized in an optical system. The optical system can comprise one or more of a control unit, a signal processor, an optical unit, a telescope, and/or a combination thereof. In some embodiments, the optical system can comprise a space telescope, for example, the National Aeronautics and Space Administration's (NASA's) Hubble Telescope and NASA's James Webb Space Telescope ("JWST").

According to various embodiments, the optical system can be configured to collect optical data, for example, intensity data. The optical system can comprise an optical unit, for example, the fine guidance sensors of the Hubble Space Telescope. The optical unit can comprise one or more mirrors, lenses, servo mechanisms, prisms, beam splitters, photomultiplier tubes, detectors, cameras, or a combination thereof. In some embodiments, the optical unit can be disposed on a space telescope that is orbiting the earth. The optical system and/or the optical unit can be manipulated by a user from the ground through the use of various wireless communication methods and wireless communication networks. A user can manipulate the optical system to adjust or move various optical components within the optical system. This feature can allow for a user to adjust the optical system to overcome aberrations, obscurations, or other errors that can result from one or more of the components of the optical system becoming displaced, for example, during launch of a rocket carrying a space telescope that comprises the optical system.

As is known in the art, to transform a digital signal from one domain to another, the discrete Fourier transform can be used. Diagonalizing the DFT matrix (the DFT eigen-problem) can be a useful equation in transforming data in the field of signal processing. The matrix can be either one-dimensional or two-dimensional. Diagonalizing the DFT matrix is described, for example, in J. H. McClellan et al., "Eigenvalue and Eigenvector Decomposition of the Discrete Fourier Transform," IEEE Trans. on Audio and Electroacoustics, Vol. AU-20 #1 (3), pp. 66-74, 1972, L. Auslander et al., "Is computing with the finite Fourier transform pure or applied mathematics?" Bull. Amer. Math. Soc., Vol. 1, pp. 847-891, 1979, and B. W. Dickinson et al., "Eigenvectors and Functions of the Discrete Fourier Transform," IEEE Trans. Acoust., Speech, Signal Processing, Vol. ASSP-30. #1 (2), pp. 25-31, 1982, all of which are incorporated herein by reference in their entireties.

Some aspects of the problem are related to topics in number theory that are solved by Gauss, as described in E. Landau, *Vorlesungen uber Zahlentheorie*, Vol. I. New York: Chelsea, 1927/1950 (reprint), p. 164, as described in L J. Good, "Analogues of Poisson's Summation Formula," Amer. Math. Monthly, Vol. 69, pp. 259-262 (1962), and J. H. McClellan, Comments on "Eigenvalue and eigenvector decomposition of the discrete Fourier transform," IEEE Trans. on Audio and Electroacoustics, Vol. AU-21, p. 65, 1973, all of which are incorporated herein by reference in their entireties. For some applications, for example, phase retrieval, the diagonal structure of the DFT is exploited in a special way, particularly when certain parts of the calculation do not have to be repeated at each iteration.

Described herein are algorithms and equations that are useful in calculating a pre-transformation and a back-transformation of a digital signal. By pre-transforming the data, performing the DFT in diagonal form, and then back transforming the data, the discrete Fourier transform can be performed faster than the FFT, for certain applications.

DFT as a Unitary Transform

According to various embodiments, the DFT calculation can be implemented in matrix form, for example, as:

$$F(v_m) \equiv DFT(v_m) = \Delta x \sum_{n=0}^{N-1} f(x_n) V_{mn},$$

where $V_{mn}$ is a non-singular M×N Vandermonde array. Examples of the Vandermonde array are described in J. Tou "Determination of the inverse Vandermonde matrix." IEEE Automatic Control (1964), p. 1820, and D. Balcan et al., "Alternative to the discrete Fourier transform." IEEE International Conference on Acoustics, Speech and Signal Processing (2008), pp. 3537-3540, both of which are incorporated herein by reference in their entireties. The Vandermonde array can be expressed as:

$$V_{mn} = e^{-i2\pi v_m (n\Delta x)} = e^{-i2\pi (m \cdot n)/M} = (e^{-2\pi i/M})^{m \cdot n} = \omega_M^{m \cdot n},$$

with components represented by:

$$V_{mn} = \begin{pmatrix} 1 & 1 & 1 & \cdots & 1 \\ 1 & \omega_M & \omega_N^2 & \cdots & \omega_M^{N-1} \\ 1 & \omega_M^2 & \omega_M^{2 \cdot 2} & \cdots & \omega_M^{2(N-1)} \\ \vdots & \vdots & \vdots & \ddots & \vdots \\ 1 & \omega_M^{M-1} & \omega_M^{(M-1) \cdot 2} & \cdots & \omega_M^{(M-1)(N-1)} \end{pmatrix}.$$

Next, $W_{mn}$ can be defined as:

$$W_{mn} = V_{mn}/\sqrt{M} = (e^{-i2\pi/M})^{m \cdot n}/\sqrt{M},$$

and then $W_{mn}$ can be expressed as a unitary matrix:

$$W \cdot W^\dagger = I,$$

using boldface matrix notation where I can be the identity matrix and the "†" symbol can denote the complex-conjugate transpose or "adjoint." The adjoint operation will be presented more generally in the next Section below. Next, letting $$f_n \equiv \Delta x f(x_n),$$

the DFT calculation in matrix form takes the form of a unitary transformation:

$$F(v_m) \equiv F_m = \sum_{n=0}^{N-1} W_{mn} f_n,$$

the inverse transformation can then be shown as (generally, taking M=N):

$$f_n = \sum_{m=0}^{M-1} (W_{mn})^\dagger F_m.$$

Knowing the unitary matrix and the unitary transformation, the DFT can be analyzed using the transformation theory of complex vector spaces. The hybrid-index notation of Schouten supplies a natural framework for this approach and is described in J. A. Schouten, *Ricci-Calculus*, 2$^{nd}$ edn., Springer-Verlag: Berlin (1954), and J. A. Schouten, *Tensor Analysis for Physicists*, 2$^{nd}$ edn., Dover: New York (1959), both of which are incorporated herein in their entireties by reference.

Hybrid Index Notation

According to various embodiments, and as previously set forth, the DFT can be represented as a unitary transformation in a complex vector space. The calculations can be performed using the tensor-transformation formalism described by Schouten. Schouten's hybrid-index notation can provide a natural framework for the DFT calculations in a complex manifold. One goal in the kernel-index approach can be to give a more general representation of the DFT calculations by identifying components with quantities of a geometric manifold. Often, but not always, such identification can lead to alternative or more efficient calculation strategies that are discussed herein. By adopting a notation that makes the transformation rules of a quantity explicit, the meaning of the calculations can often be clarified and the notation can serve as an efficient bookkeeping device for checking consistency throughout the calculations.

DFT in Hybrid-Index Notation

According to various embodiments, the DFT can be defined as a unitary transform between conjugate Fourier domains. The one-dimensional DFT transform can be expressed using Schouten's hybrid-index notation as:

$$F^m = W^m{}_n f^n,$$

and using the Einstein sum convention defined over a repeated indices in an upper/lower combination, the transform can be expressed as:

$$\sum_n W_{mn} f_n \equiv W^m{}_{\cdot n} f^n.$$

The upper/lower indices denote the covariant and contravariant transformation rules, respectively, for either a transformation of coordinates, or a "point transformation." Allowable transformations of coordinates for this application will be discussed herein. The distinction between the transformations of coordinates and point transformations are described in Schouten's kernel-index method. To elaborate briefly, coordinate transformations are denoted by a transformation of basis, say, m→m', where the new basis set is denoted by m'. The components in the transformation basis can be represented as:

$$u^{m'} = A_m{}^{m'} u^m,$$

where $A_m{}^{m'}$ is the transformation matrix, the $u^{m'}$ is the vector component in a new basis set, and u is arbitrary. A point transformation, meanwhile, can be represented as:

$$U^m = P^m{}_n u^n,$$

which is the form adopted for the DFT using the Schouten's hybrid-index notation. Another distinction between a transformation of basis and a point transformation is that the indices for the point transformation are ordered and the positions are marked using over- or under-dots as in $P^m{}_{\cdot n}$. The main take-away is that for coordinate transformations, the kernel symbol, u, remains the same. For point transformations, however, the kernel symbol changes but the indices remain the same. The DFT transformation expressed using Schouten's hybrid-index notation is defined as a point transformation, but when calculating the DFT in a diagonal basis, it is possible to consider the DFT using Schouten's hybrid-index notation, such that one can use a common kernel symbol for the Fourier transform pair, for example, $(F^m, f^n) \to (f_{\overline{m}}, f^n)$. In some embodiments, the two transformations (basis and point) can be mixed, and can be used for transformations of basis in digital signal processing.

According to various embodiments, the complex conjugate of the DFT using the hybrid-index notation can be expressed as:

$$\overline{F^m} = \overline{W^m{}_n} \overline{f^n},$$

where the over-bar can denote the complex conjugation of components and kernel symbols in accordance with Schouten's hybrid-index notation. Further, $$\overline{F^m} = \overline{F^m} \Rightarrow \overline{F^m} = \overline{F^m} = F^{\overline{m}}.$$

The conjugation of indices and kernel objects can be used for calculations of the DFT transform. In some embodiments, the data values can be labeled by a contravariant component, $f^m$, and by complex conjugation of the kernel symbol and indices in various combinations, several other types of components can be represented in Schouten's notation by the raising and lowering of indices using the fundamental or metric tensor, $a_{\overline{k}l}$, for example, $$F^m, f_{\overline{m}}, \overline{f^n}, \overline{f_m},$$

where the latter two can follow by complex conjugation of the first two. Contravariant component $f^m$ and its inverse can be defined as:

$$f^n \Rightarrow f_{\overline{m}} = a_{\overline{m}n} f^n; \overline{f^m} \Rightarrow \overline{f_m} = a_{\overline{m}n} \overline{f^n},$$

and as mentioned above, covariant and contravariant transformation rules can be switched back and forth using the metric or fundamental tensor, $a_{\overline{k}l}$, to raise or lower indices as appropriate. The metric tensor can define how the differential element of distance can be calculated in the geometric manifold as well as the inner product between two vectors, for example, $u^k$ and $v^l$, thus, $$\langle u | v \rangle = a_{\overline{k}l} \overline{u^k} v^l = \overline{u_l} v^l = \overline{u^k} v_{\overline{k}}.$$

The metric for raising and lowering indices can be represented as:

$$W^m{}_{\cdot n} = a_{ln} W^{ml}$$

and $$f^n = \overline{a}^{n\overline{k}} f_{\overline{k}},$$

and then substituting these expressions back into the DFT using Schouten's hybrid-index notation, an alternative form of the DFT can be obtained:

$$F^m = W^m{}_{\cdot n} f^n$$
$$= (a_{ln} W^{ml})(\overline{a}^{n\overline{k}} f_{\overline{k}})$$
$$= a_{ln} \overline{a}^{n\overline{k}} W^{ml} f_{\overline{k}}$$
$$= \delta^{\overline{k}}_l W^{ml} f_{\overline{k}}$$
$$\Rightarrow F^m = W^{m\overline{n}} f_{\overline{n}}.$$

Adjoint in a Geometric Manifold

According to various embodiments, the adjoint operation applied to the $W^m{}_n$, denoted by $\tilde{W}^m{}_{\cdot n}$ denoted by $$\tilde{W}^m{}_{\cdot n} = (W^m{}_{\cdot n})^\dagger$$

can be defined through a two-step operation using both the metric tensor and complex conjugation, for example:

(a) each index can be raised or lowered as appropriate using the metric tensor:

$$a_{\overline{n}k} \overline{a}^{\overline{m}l} W^k{}_l = W_{\overline{n}}{}^{\overline{m}},$$

(b) the result in (a) can be complex conjugated to give $$(W^m{}_n)^\dagger = \overline{a_{nk} \overline{a}^{lm} W^k{}_l} = \overline{W_{\overline{n}}{}^{\overline{m}}} = \overline{W}_n{}^m,$$

and therefore, $$\tilde{W}^m{}_n = (W^m{}_n)^\dagger = \overline{W}_n{}^m,$$

A comparison can be made in matrix boldface notation:

$$(W)^\dagger = \overline{W^T} = a\, W a^{-1} = W^{-1},$$

where "T" defines the transpose operation that is well known in the art. The matrix bold face notation illustrates a degree of non-generality in the way the adjoint can be calculated in matrix notation. Specifically, defining the adjoint using components in a geometric manifold (using steps (a) and (b) above) can give different results than complex conjugating and then performing the transpose operation using the "T". In special coordinates, $$a_{\bar{n}k} \doteq \delta^c_{\bar{n}k},$$

these two can be identical, but in general, that is not always the case for arbitrary $a_{\bar{n}k}$.

According to various embodiments, because the $W^m{}_n$, are unitary, the inverse, $\overset{-1}{W}{}^m{}_n$ can be defined using the adjoint and can be expressed as:

$$\tilde{W}^m_{\cdot n} = \overset{-1}{W}{}^m_{\cdot n} = (W^m_{\cdot n})^\dagger = \overline{W_n^m},$$

such that $$W^m{}_k \tilde{W}^q{}_n = \delta^l{}_k,$$

Considering the $W^m{}_n$ using two upper indices, $W_{m\bar{n}}$, the corresponding adjoint can be calculated:

$$(W^{m\bar{n}})^\dagger = a_{\overline{m}k} a_{\bar{l}n} W^{\bar{k}\bar{l}} = \overline{W_{\overline{mn}}} = \overline{W_{m\bar{n}}} = \tilde{W}_{\bar{n}m}.$$

The inverse DFT transformation to the hybrid-index notation can be defined as:

$$\tilde{W}^n{}_m F^m = \tilde{W}^n{}_m W^m{}_k f^k = \delta^n{}_k f^k = f^n,$$

and when using Schouten's hybrid-index notation, the DFT can be represented as:

$$\tilde{W}_{m\bar{n}} F^m = \tilde{W}_{m\bar{n}}(W^{m\bar{k}} f_{\bar{k}}) = \delta^{\bar{k}}_{\bar{n}} f_{\bar{k}} = f_{\bar{n}}.$$

In some embodiments, in tensor transformation theory, there can be geometric meaning attributed to these differing but complementary transformation rules. Specific transformations can be defined by an allowable group of transformations, for example, $G_a$. The corresponding allowable transformations of basis for the DFT application in digital signal processing, can include fractional and integer shifts of the data origin in addition to scaling and phase transformations. The details for these various transformations are discussed herein.

Matrix Multiplication Using Index Notation

According to various embodiments, when calculating with components, index order is important for proper matrix multiplication and thus it is desirable to adopt the following convention for a rank-2 quantity:

$$A^{m \to row}_{n \downarrow col},$$

and the inverse of $A^m{}_n$, can be notated as, $\overset{-1}{A}{}^m{}_n$, such that $$A^m{}_n \overset{-1}{A}{}^n{}_k = \delta^m{}_k$$

where $\delta^m{}_k$ is the Kronecker delta. To illustrate, the matrix multiplication of two matrices A and B can be notated as:

$$C^m{}_k = A^m{}_n B^n{}_k,$$

and to be specific the matrix can be calculated using Mathematica with 2×2 arrays. The Mathematic code can be represented as, for example:

Table[Sum [(A[[um, n]] B[[n, lk]]), {n, 1, NN}], {um, 1, 2}, {lk, 1, 2}]]

where um denotes "upper-m" and lk denotes "lower-k," the upper/lower dummy variable, n, can be left un-notated in Mathematica with regard to its position. The result can be represented as:

$$C^m_{\cdot k} = A^m_{\cdot n} B^n_{\cdot k} = AB = \begin{pmatrix} a^1_{\cdot 1} b^1_{\cdot 1} + a^1_{\cdot 2} b^2_{\cdot 1} & a^1_{\cdot 1} b^1_{\cdot 2} + a^1_{\cdot 2} b^2_{\cdot 2} \\ a^2_{\cdot 1} b^1_{\cdot 1} + a^2_{\cdot 2} b^2_{\cdot 1} & a^2_{\cdot 1} b^1_{\cdot 2} + a^2_{\cdot 2} b^2_{\cdot 2} \end{pmatrix},$$

where AB is the conventional matrix product using matrix boldface notation. For comparison, reversing the order of the AB matrix to the BA matrix and transposing both the m-n and n-k index positions gives the BA matrix product:

$$C^m_{\cdot k} = A^{\cdot m}_n B^{\cdot n}_k = BA = \begin{pmatrix} b^1_{\cdot 1} a^1_{\cdot 1} + b^1_{\cdot 2} a^2_{\cdot 1} & b^1_{\cdot 1} a^1_{\cdot 2} + b^1_{\cdot 2} a^2_{\cdot 2} \\ b^2_{\cdot 1} a^1_{\cdot 1} + b^2_{\cdot 2} a^2_{\cdot 1} & b^2_{\cdot 1} a^1_{\cdot 2} + b^2_{\cdot 2} a^2_{\cdot 2} \end{pmatrix},$$

and the corresponding Mathematica code for the BA matrix can be, for example:

Table[Sum [(A[[n, um]] B[[lk, n]]), {n, 1, NN}], {um, 1, 2}, {lk, 1, 2}]]

Deriving the Metric Tensor from Unitary Invariance

According to various embodiments, various geometric quantities can be defined that can be distinguished by their transformation rules using index position. For example, a group of allowable transformations, $G_a$, can be introduced and then several invariant quantities can be constructed based on invariance of a given symmetry group. One such quantity can be the metric tensor, $a_{\bar{k}l}$, that can define distance in the manifold and can also define the inner product between any two vectors. The DFT metric tensor, $a_{\bar{k}l}$, can be solved for postulating the unitary invariance under the action of the point transformation, $W^m{}_n$, as illustrated below. The $W^m{}_n$ can be defined as a unitary transformation and a metric tensor can be defined by invariance under the action of the $W^m{}_n$ transformation such that:

$$W^m{}_l W^{\bar{n}}_{\bar{k}} a_{\overline{m}n} = a_{\bar{k}l},$$

or in matrix form:

$$W\, a\, W^{-i} = a.$$

Quantities that are invariant under the action of the unitary group can be hermitian and thus the $a_{\bar{k}l}$ can satisfy $$a_{\bar{k}l} = (a_{\bar{k}l})^\dagger = \overline{a}_{\bar{l}k},$$

The introduction of a hermitian metric $a_{\bar{k}l}$ into the $E_n$ geometric manifold defines the manifold as a $U_n$ which differs from the earlier notation used by Schouten, where this manifold was labeled as the $\tilde{R}_n$.

General Form of Parseval's Theorem

According to various embodiments, Parseval's theorem can be implied by unitary invariance, and not necessarily energy conservation as it is commonly referred to in the art. Consider the magnitude squared of $F^m \rightarrow |F|^2$, that can be represented as:

$$\langle F|F \rangle = |F|^2 = a_{\overline{m}n} \overline{F}^m F^n.$$

Substituting the DFT transformation rule from the hybrid-index notation equation we have:

$$|F|^2 = a_{\overline{m}n} W^m{}_k \overline{W}_{\overline{l}}^{\overline{n}} \overline{f}^{\overline{l}} f^{\overline{l}},$$

but since the $a_{\overline{k}l}$ can be invariant under this unitary transformation the right hand side can be simplified to:

$$|F|^2 = a_{\overline{k}l} \overline{f}^{\overline{k}} f^l.$$

Parseval's theorem is seen to hold for any solution of the $a_{\overline{k}l}$, as amplified by unitary invariance, and thus in general:

$$a_{\overline{m}n} \overline{F}^m F^n = a_{\overline{k}l} \overline{f}^{\overline{k}} f^l.$$

The common form of Parseval's theorem can be expressed in vector notation as $$|F|^2 = |f|^2.$$

In some embodiments, the standard DFT approach can be a special solution, for example, a coordinate system, such that for the $a_{\overline{k}l}$ given by the Kronecker delta:

$$a_{\overline{n}k} \doteq \delta_{\overline{n}k},$$

and so in index notation Parseval's theorem in vector notation can take a Euclidean form:

$$\delta_{\overline{m}n} \overline{F}^m F^n = \delta_{\overline{k}l} \overline{f}^{\overline{k}} f^l,$$

or as it is commonly written:

$$|F_1|^2 + |F_2|^2 + \ldots + |F_N|^2 = |f_1|^2 + |f_2|^2 + \ldots + |f_N|^2.$$

According to various embodiments, the $\delta_{\overline{k}l}$ can be a solution for the $a_{\overline{k}l}$ and can correspond to a positive definite signature solution. The approach taken here can be motivated by that fact that in general, an eigen-problem requires the use of a general metric, and by no means does this necessarily correspond to the Kronecker delta in a unitary complex vector space, $U_n$. Below is described how the Kronecker delta solution is used to make progress on the main point of calculating the DFT in a diagonal basis, and for easy comparison with previously published results.

Metric Solutions

In a $U_2$

By postulating unitary invariance of the metric one can solve for the $a_{\overline{k}l}$. The $W^m{}_k$ can be identified with as The $W^m{}_n$, as previously set forth. Therefore, The $W^m{}_k$ can be represented as:

$$W^m{}_k \equiv \frac{1}{\sqrt{M}} (e^{-i2\pi(mk)/M}) = \frac{1}{\sqrt{2}} \begin{pmatrix} 1 & 1 \\ 1 & -1 \end{pmatrix}.$$

The inverse transformation can be defined through the adjoint operation. Therefore, the inverse transformation, $\overset{-1}{W}{}^m{}_k$, can be represented as:

$$W^m_n \overset{-1}{W}{}^n_k = \delta^m_k,$$

and the $\Rightarrow$ can be given by:

$$\overset{-1}{W}{}^m_k = \overline{W}^m_k = \frac{1}{\sqrt{M}} (e^{i2\pi(mk)/M}) = \frac{1}{\sqrt{2}} \begin{pmatrix} 1 & 1 \\ 1 & -1 \end{pmatrix}.$$

Continuing to the general 2×2 metric, $a_{\overline{k}l}$ can be defined as $$a_{\overline{k}l} = \begin{pmatrix} z_{\overline{1}1} & z_{\overline{1}2} \\ z_{\overline{2}1} & z_{\overline{2}2} \end{pmatrix} = \begin{pmatrix} x_{11} + iy_{11} & x_{12} + iy_{12} \\ x_{21} + iy_{21} & x_{22} + iy_{22} \end{pmatrix},$$

where the complex notation is dropped on indices of real components. The condition for unitary invariance then can provide the following simultaneous system of 4 equations and 8 unknowns:

$$\frac{1}{2} \begin{pmatrix} z_{\overline{1}1} + z_{\overline{1}2} + z_{\overline{2}1} + z_{\overline{2}2} & z_{\overline{1}1} - z_{\overline{1}2} + z_{\overline{2}1} - z_{\overline{2}2} \\ z_{\overline{1}1} + z_{\overline{1}2} - z_{\overline{2}1} - z_{\overline{2}2} & z_{\overline{1}1} - z_{\overline{1}2} - z_{\overline{2}1} + z_{\overline{2}2} \end{pmatrix} = \begin{pmatrix} z_{\overline{1}1} & z_{\overline{1}2} \\ z_{\overline{2}1} & z_{\overline{2}2} \end{pmatrix}.$$

The unknowns of the system can have many possible solutions but will be further constrained by the hermitian condition. Solving the system eliminates four of the unknowns ($z_{\overline{1}1}$ and $z_{\overline{1}2}$) in terms of the other four unknowns ($z_{\overline{2}1}$ and $z_{\overline{2}2}$) showing that $a_{\overline{k}l}$ has the general form:

$$a_{\overline{k}l} = \begin{pmatrix} 2z_{\overline{2}1} + z_{\overline{2}2} & z_{\overline{2}1} \\ z_{\overline{2}1} & z_{\overline{2}2} \end{pmatrix}.$$

Applying the hermitian (symmetry) condition to the other four unknown gives the condition that the 2×2 $a_{\overline{k}l}$ can be valued:

$$\begin{pmatrix} 2y_{21} + y_{22} & y_{21} \\ y_{21} & y_{22} \end{pmatrix} = \begin{pmatrix} 0 & 0 \\ 0 & 0 \end{pmatrix} \Rightarrow \text{Im}(a_{\overline{k}l}) = 0,$$

but there are multiple solutions for the $a_{\overline{k}l}$ in terms of the 2 final parameters $x_{21}$ and $x_{22}$. The general solution for the 2×2 case can then be reduced from 8 to 2 unspecified real components and can be represented, for example, as:

$$a_{\overline{k}l} = \begin{pmatrix} 2x_{21} + x_{22} & x_{21} \\ x_{21} & x_{22} \end{pmatrix}.$$

According to various embodiments, the solution can be checked by substituting the general solution back into the metric tensor. This verifies that this $a_{\overline{k}l}$ is invariant under the action of the $W^m{}_k$ for arbitrary, but real, numerical values of $x_{21}$ and $x_{22}$. According to various embodiments, an infinite number of solutions can exist for the 2×2 metric, $a_{\overline{k}l}$, as implied by unitary invariance in terms of two real parameters. One possible solution is the special case of when $x_{21}=0$ and $x_{22}=1$ giving the Kronecker delta, as mentioned earlier:

$$a_{\bar{k}l}\Big|_{\substack{x_{21}\to 0 \\ x_{22}\to 1}} \stackrel{*}{=} \begin{pmatrix} 1 & 0 \\ 0 & 1 \end{pmatrix} \stackrel{*}{=} \delta_{\bar{k}1},$$

where the complex conjugation is kept for consistency, and the numeral "1" beneath the kernel symbol in Schouten's notation labels this case as a distinct solution, different from other solution, say $\underset{2}{q}_{\bar{k}l}$. The labeling of kernel symbols in this way can be used in the eigen-problem discussed herein.

According to various embodiments, and as mentioned previously, there are an infinite number of solutions for the $a_{\bar{k}l}$. Examples of such solutions can be the following, based on various choices for the $x_{21}$ and $x_{22}$ components:

$$\underset{1}{a}_{\bar{k}l}\Big|_{\substack{x_{21}\to 0 \\ x_{22}\to 1}} \stackrel{*}{=} \begin{pmatrix} 1 & 0 \\ 0 & 1 \end{pmatrix}; \quad \underset{2}{a}_{\bar{k}l}\Big|_{\substack{x_{21}\to 1 \\ x_{22}\to -1}} \stackrel{*}{=} \begin{pmatrix} 1 & 1 \\ 1 & -1 \end{pmatrix}$$

$$\underset{3}{a}_{\bar{k}l}\Big|_{\substack{x_{21}\to 1 \\ x_{22}\to 0}} \stackrel{*}{=} \begin{pmatrix} 2 & 0 \\ 0 & 1 \end{pmatrix}; \quad \underset{4}{a}_{\bar{k}l}\Big|_{\substack{x_{21}\to -\frac{1}{2} \\ x_{22}\to 1}} \stackrel{*}{=} \begin{pmatrix} 0 & -\frac{1}{2} \\ -\frac{1}{2} & 1 \end{pmatrix},$$

Using some specific solutions for the $a_{\bar{k}l}$, one can examine various other quantities that are derived in Schouten's notation. For example, consider the second solution above that is a multiple of the $W^m{}_n$:

$$a_{\bar{k}l} \equiv \underset{2}{a}_{\bar{k}l} \stackrel{*}{=} \begin{pmatrix} 1 & 1 \\ 1 & -1 \end{pmatrix} \Rightarrow a^{kl} \stackrel{*}{=} \frac{1}{2}\begin{pmatrix} 1 & 1 \\ 1 & -1 \end{pmatrix},$$

and then for generality define a complex data vector:

$$f^n = (z^1, z^2) = (x^1 + iy^1, x^2 + iy^2).$$

The DFT transformation can be represented as:

$$F^m = W^m{}_n f^n = \frac{1}{\sqrt{2}}(z^1 + z^2, z^1 - z^2).$$

As a consistency check on both the solution for the $a_{\bar{k}l}$, and the legitimacy of constructing the inverse transformation by use of the adjoint operation, i.e., $$\overset{-1}{W}{}^m_{\cdot n} = (W^m_{\cdot n})^\dagger \equiv \tilde{W}^m_n,$$

one can check the inverse transformation calculated by way of the adjoint:

$$(W^m_{\cdot n})^\dagger = a_{\bar{n}k} a^{lm} W^k_{\cdot l}$$

$$= \underbrace{\begin{pmatrix} 1 & 1 \\ 1 & -1 \end{pmatrix}}_{a_{\bar{n}k}} \underbrace{\frac{1}{\sqrt{2}}\begin{pmatrix} 1 & 1 \\ 1 & -1 \end{pmatrix}}_{W^k_{\cdot l}} \underbrace{\frac{1}{2}\begin{pmatrix} 1 & 1 \\ 1 & -1 \end{pmatrix}}_{a^{lm}}$$

$$= \frac{1}{\sqrt{2}}\begin{pmatrix} 1 & 1 \\ 1 & -1 \end{pmatrix}$$

$$= \overset{-1}{W}{}^m_{\cdot n},$$

The inverse DFT transformation can also be checked for consistency giving $$\tilde{W}^m_n F^m = \frac{1}{\sqrt{2}}\begin{pmatrix} 1 & 1 \\ 1 & -1 \end{pmatrix}\begin{pmatrix} z^1 + z^2 \\ z^1 - z^2 \end{pmatrix} = (z^1, z^2) = f^n.$$

According to various embodiments, several other quantities can be derived from the $f^n$ using the $a_{\bar{k}l}$:

$$f^n = (z^1, z^2); f_{\bar{n}} = a_{\bar{n}k} f^k = (z^1 + z^2, z^1 - z^2)$$

$$\bar{f}^{\bar{k}} = \overline{f^k} = (\bar{z}^1, \bar{z}^2); \bar{f}_k = a_{\bar{n}k} \bar{f}^{\bar{n}} = (\bar{z}^1 + \bar{z}^2, \bar{z}^1 - \bar{z}^2),$$

and comparing the right hand sides of the previous equations, as expected the result is $f_n = \overline{(f_x)}$. Correspondingly, various other $F^m$ quantities can be given by $$F^m = \frac{1}{\sqrt{2}}(z^1 + z^2, z^1 - z^2); \quad F_m = a_{mk} F^k = \sqrt{2}(z^1, z^2)$$

$$\bar{F}^m = \frac{1}{\sqrt{2}}(\bar{z}^1 + \bar{z}^2, \bar{z}^1 - \bar{z}^2); \quad \bar{F}_m = a_{\bar{n}m} \bar{F}^n = \sqrt{2}(\bar{z}^1, \bar{z}^2).$$

and components for the $W^{m\bar{n}}$ and the $W_{\bar{m}n}$ can be calculated:

$$W^{m\bar{n}} = a^{k\bar{n}} W^m_{\cdot k} = \begin{pmatrix} \frac{1}{\sqrt{2}} & 0 \\ 0 & \frac{1}{\sqrt{2}} \end{pmatrix}; \quad W_{\bar{m}n} = a_{\bar{k}n} W^{\bar{k}}_{\cdot m} = \begin{pmatrix} \sqrt{2} & 0 \\ 0 & \sqrt{2} \end{pmatrix}.$$

In some embodiments, using the $f_{\bar{n}}$, and then comparing with the $F^m$, one can check the forward DFT for consistency using the $W^{m\bar{n}}$:

$$W^{m\bar{n}} f_{\bar{n}} = \begin{pmatrix} \frac{1}{\sqrt{2}} & 0 \\ 0 & \frac{1}{\sqrt{2}} \end{pmatrix}\begin{pmatrix} z^1 + z^2 \\ z^1 - z^2 \end{pmatrix} = \frac{1}{\sqrt{2}}(z^1 + z^2, z^1 - z^2) = F^m.$$

The adjoint operation on the $W^{m\bar{n}}$ and $W_{\bar{m}n}$ in can be similarly verified:

$$(W^{m\bar{n}})^\dagger \equiv \tilde{W}_{\bar{l}k}$$

$$= a_{m\bar{k}} a_{\bar{n}l} W^{m\bar{n}}$$

$$= \begin{pmatrix} 1 & 1 \\ 1 & -1 \end{pmatrix}\begin{pmatrix} \frac{1}{\sqrt{2}} & 0 \\ 0 & \frac{1}{\sqrt{2}} \end{pmatrix}\frac{1}{2}\begin{pmatrix} 1 & 1 \\ 1 & -1 \end{pmatrix}$$

$$= \begin{pmatrix} \sqrt{2} & 0 \\ 0 & \sqrt{2} \end{pmatrix},$$

such that $$W^{m\bar{n}} \tilde{W}_{\bar{k}n} = \delta^{\bar{n}}_{\bar{k}}.$$

Finally, Parseval's theorem can be demonstrated as:

$$a_{\bar{m}n}\bar{F}^m F^n = a_{\bar{k}l}\bar{f}^{\bar{k}}f^l = |z^1|^2 - |z^2|^2,$$

which is invariant.

The General DFT

According to various embodiments, further restrictions can be placed on the solution values for the $x_{21}$ and $x_{22}$, by classifying $a_{\bar{k}l}$ as being positive definite, negative definite, or indefinite, corresponding to the number of values (that are greater than zero, less than zero, or mixed, respectively), along the diagonal of the $a_{\bar{k}l}$. When $a_{\bar{k}l}$ is definite there is no distinction between the various quantities that can be derived from $a_{\bar{k}l}$ in the $U_2$, and thus, numerical distinctions do not have to exist for components labeled by upper/lower indices, or even the complex conjugation of indices. Because $a_{\bar{k}l}$ can be used to solve the eigen-problem, there can be different solutions for the eigen-problem corresponding to different solutions for the $a_{\bar{k}l}$. Different solutions for the $a_{\bar{k}l}$ can lead to different DFT eigen-quantities, but all the while preserving unitary invariance and the hermitian character of the $a_{\bar{k}l}$. From the perspective of the transformation theory of complex vector spaces, one can regard some properties of the DFT as deriving from the characteristics of the $a_{\bar{k}l}$, for example, (a) a $\bar{k}l$ can be invariant under unitary transformations and (b) is hermitian. Condition (b) can be derived from (a) but it can be convenient when solving for the $a_{\bar{k}l}$ components, to regard (b) as an independent condition.

In a $U_4$

In some embodiments, the solution to $a_{\bar{k}l}$ corresponding to larger dimensional data sets can be solved for. Solutions where the $a_{\bar{k}l}$ are complex valued can provide consistency checks on the proper use of Schouten's notation. By deriving a 4×4 $W^m_{\;k}$ and its inverse, $\overset{-1}{W}{}^m_{\;k}$, that can be represented as:

$$W^m_{\;k} = \frac{1}{2}\begin{pmatrix} 1 & 1 & 1 & 1 \\ 1 & -i & -1 & i \\ 1 & -1 & 1 & -1 \\ 1 & i & -1 & -i \end{pmatrix};$$

$$\overset{-1}{W}{}^m_{\;k} = \tilde{W}^m_{\;k} = \overline{W}{}^m_{\;k} = \frac{1}{2}\begin{pmatrix} 1 & 1 & 1 & 1 \\ 1 & i & -1 & -i \\ 1 & -1 & 1 & -1 \\ 1 & -i & -1 & i \end{pmatrix},$$

and a general 4×4 metric can be defined as:

$$a_{\bar{k}l} = \begin{pmatrix} z_{\bar{1}1} & z_{\bar{1}2} & z_{\bar{1}3} & z_{\bar{1}4} \\ z_{\bar{2}1} & z_{\bar{2}2} & z_{\bar{2}3} & z_{\bar{2}4} \\ z_{\bar{3}1} & z_{\bar{3}2} & z_{\bar{3}3} & z_{\bar{3}4} \\ z_{\bar{4}1} & z_{\bar{4}2} & z_{\bar{4}3} & z_{\bar{4}4} \end{pmatrix}.$$

According to various embodiments, the condition for unitary invariance can provide a simultaneous system of 16 equations and 32 unknowns which can be further reduced to six free parameters by imposing the hermitian condition on the $a_{\bar{k}l}$. After considerable algebra, the general solution for the $a_{\bar{k}l}$, constrained by the hermitian condition, can be represented as:

$$a_{\bar{k}l} = \begin{pmatrix} x_{33} + 2(x_{41} + x_{43}) & x_{41} - iy_{43} & (x_{33} + x_{41} - x_{42} + x_{43} - x_{44} + 2iy_{43}) & x_{41} - iy_{43} \\ x_{41} + iy_{43} & x_{44} & x_{43} + iy_{43} & x_{42} \\ (x_{33} + x_{41} - x_{42} + x_{43} - x_{44} + 2iy_{43}) & x_{43} - iy_{43} & x_{33} & x_{43} - iy_{43} \\ x_{41} + iy_{43} & x_{42} & x_{43} + iy_{43} & x_{44} \end{pmatrix}.$$

There are an infinite number of both real and complex valued 4×4 solutions for the $a_{\bar{k}l}$ in terms of the six free parameters. Several example solutions corresponding to basic numerical values for the x and y components can be the following:

$$\left. a_{1\bar{k}l} \right|_{\substack{x_{33}\to 1, x_{44}\to 1 \\ x_{41}\to 0, x_{42}\to 0 \\ x_{43}\to 0, y_{43}\to 0}} \overset{*}{=} \begin{pmatrix} 1 & 0 & 0 & 0 \\ 0 & 1 & 0 & 0 \\ 0 & 0 & 1 & 0 \\ 0 & 0 & 0 & 1 \end{pmatrix};$$

$$\left. a_{2\bar{k}l} \right|_{\substack{x_{33}\to 1, x_{44}\to 1 \\ x_{41}\to 0, x_{42}\to 0 \\ x_{43}\to 0, y_{43}\to 1}} \overset{*}{=} \begin{pmatrix} 1 & -i & 2i & -i \\ i & 1 & i & 0 \\ -2i & -i & 1 & -i \\ i & 0 & i & 1 \end{pmatrix}$$

$$\left. a_{3\bar{k}l} \right|_{\substack{x_{33}\to 1, x_{44}\to 1 \\ x_{41}\to -1, x_{42}\to 0 \\ x_{43}\to 0, y_{43}\to 0}} \overset{*}{=} \begin{pmatrix} 1 & -1 & 0 & -1 \\ -1 & 1 & 1 & 0 \\ 0 & 1 & 1 & 1 \\ -1 & 0 & 1 & 1 \end{pmatrix};$$

$$\left. a_{4\bar{k}l} \right|_{\substack{x_{33}\to 1, x_{44}\to 1 \\ x_{41}\to -1, x_{42}\to 0 \\ x_{43}\to 0, y_{43}\to 0}} \overset{*}{=} \begin{pmatrix} -1 & -1 & -1 & -1 \\ -1 & 1 & 0 & 0 \\ -1 & 0 & 1 & 0 \\ -1 & 0 & 0 & 1 \end{pmatrix}.$$

For exemplary purposes, a solution can illustrate a few of the basic quantities that are derived for the DFT in Schouten's notation. For generality, consider the following complex-valued solution for the $a_{\bar{k}l}$:

$$a_{\bar{k}l} \equiv a_{2\bar{k}l} \overset{*}{=} \begin{pmatrix} 1 & -i & 2i & -i \\ i & 1 & i & 0 \\ -2i & -i & 1 & -i \\ i & 0 & i & 1 \end{pmatrix},$$

and then the inverse can be represented as:

$$\overset{-1}{a}_{\bar{k}l} = a^{\bar{k}l} \overset{*}{=} \frac{1}{7}\begin{pmatrix} 1 & -2-i & -2+2i & -2-i \\ -2+2i & 5 & 2+i & -2 \\ -2-2i & 2-i & 1 & 2-i \\ -2+i & -2 & 2+i & 5 \end{pmatrix}.$$

To illustrate some specific quantities we can define a general complex "data" vector:

$$f^n = (z^1, z^2, z^3, z^4),$$

and then the DFT transformation can be represented as:

$$F^m = W_n^m f^n = \frac{1}{2}\begin{pmatrix} z^1 + z^2 + z^3 + z^4 \\ z^1 - iz^2 - z^3 + iz^4 \\ z^1 - z^2 + z^3 - z^4 \\ z^1 + iz^2 - z^3 - iz^4 \end{pmatrix}.$$

Applying the inverse DFT transformation can show that:

$$\tilde{W}_{\cdot m}^n F^m = \frac{1}{4}\begin{pmatrix} 1 & 1 & 1 & 1 \\ 1 & i & -1 & -i \\ 1 & -1 & 1 & -1 \\ 1 & -i & -1 & i \end{pmatrix}\begin{pmatrix} z^1 + z^2 + z^3 + z^4 \\ z^1 - iz^2 - z^3 + iz^4 \\ z^1 - z^2 + z^3 - z^4 \\ z^1 + iz^2 - z^3 - iz^4 \end{pmatrix}$$

$$= (z^1, z^2, z^3, z^4)$$

$$= f^n.$$

Other quantities can be derived from the $F^m$ using the $a_{\bar{k}l}$, for example:

$$f_{\bar{k}} = a_{\bar{k}n}f^n = \frac{1}{2}\begin{pmatrix} z_1 - iz_2 + 2iz_3 - iz_4 \\ iz_1 + z_2 + iz_3 \\ -2iz_1 - iz_2 + z_3 - iz_4 \\ iz_1 + iz_3 + z_4 \end{pmatrix},$$

and a further check can be performed to show that $f_x = \overline{(f_n)}$, by calculating:

$$a_{\bar{k}n}(\overline{f^k}) = a_{\bar{k}n}\bar{f}^n = \bar{f}_n = \frac{1}{2}\begin{pmatrix} \bar{z}_1 + i\bar{z}_2 - 2i\bar{z}_3 + i\bar{z}_4 \\ -i\bar{z}_1 + \bar{z}_2 - i\bar{z}_3 \\ 2i\bar{z}_1 + i\bar{z}_2 + \bar{z}_3 + i\bar{z}_4 \\ -i\bar{z}_1 - i\bar{z}_3 + \bar{z}_4 \end{pmatrix}.$$

Comparing $f_{\bar{n}}$ to the complex conjugation of $\bar{f}_n$ it can be seen that:

$$f_{\bar{n}} = \overline{(f_n)},$$

demonstrating consistency using the hybrid-index notation. Correspondingly, one can lower indices of the $F^m$ to get the following result:

$$F_{\bar{k}} = a_{\bar{k}m}F^m = \frac{1}{2}\begin{pmatrix} z^1 + (1-2i)z^2 + (1+4i)z^3 + (1-2i)z^4 \\ (1+2i)z^1 - iz^2 - (1-2i)iz^3 + iz^4 \\ (1-4i)z^1 - (1+2i)z^2 + z^3 - (1+2i)z^4 \\ (1+2i)z^1 + iz^2 + (2i-1)z^3 - iz^4 \end{pmatrix}.$$

Parseval's theorem can be invariant expected:

$$a_{\overline{mn}}\bar{F}^m F^n = a_{\bar{k}l}\bar{f}^k f^l = |z^1|^2 + |z^2|^2 + |z^3|^2 + |z^4|^2,$$

As pointed our earlier, Parseval's theorem can take different forms for the different $a_{\bar{k}l}$ solutions. For example, consider:

$$a_{\overline{mn}}\bar{F}^m F^n = a_{\bar{k}l}\bar{f}^k f^l = -|z^1|^2 + |z^2|^2 + |z^3|^2 + |z^4|^2 - 2z^1(z^2 + z^3 + z^4),$$

which is invariant but not real valued.

Example of Eigenvalue-Eigenvector Problem

As previously set forth, multiple solutions for the $a_{\bar{k}l}$ exist based on unitary invariance, and thus, more general calculations of the DFT and its various quantities can be extended to arbitrary basis sets. The additional generality stems from the possibility that the metric tensor does not necessarily have to be the Kronecker delta. As is known in the art, the eigenvalue-eigenvector problem ("eigen-problem") seeks solutions to the following set equations:

$$T_{\overline{mn}}\underset{a}{v}^n = \underset{a}{\sigma}\,\underset{a}{v}_{\bar{m}},$$

for the vectors $\underset{a}{v}^n$ of a general rank-2 quantity, $T_{\overline{mn}}$. The scalar values, $\underset{a}{\sigma}$ are the eigenvalues and the $\underset{a}{v}^n$ are the eigenvectors. The "a" index below the kernel object, in this case, $\underset{a}{v}^n$ and $\underset{a}{\sigma}$, does not refer to a component, but rather, the a-th eigenvector, $\underset{a}{v}$, corresponding to the a-th eigenvalue, $\underset{a}{\sigma}$, as separate and distinct solutions. Indices can be chosen from a set, for example, {a, b, c, d}, to label the kernel objects corresponding to distinct eigen-solutions, and then reserve an index range, for example, {k, l, m, n}, to label the kernel objects corresponding to distinct eigen-solutions, and then reserve the index range, {k, l, m, n}, to label components of a given basis.

According to various embodiments, $W_{\overline{mn}}$ can be substituted into the eigen-problem:

$$W_{\overline{mn}}\underset{a}{v}^n = \underset{a}{\sigma}\,\underset{a}{v}_{\bar{m}},$$

thus switching the common kernel symbol for the Fourier transform pair, $(F^m, f^n) \rightarrow (v_{\bar{m}}, v^n)$, with the substitutions:

$$v^n \equiv f^n \text{ and } F_{\bar{m}} \equiv v_{\bar{m}}.$$

The solution to the eigen-problem can result in a transformation of the $W_{\overline{mn}}$ into a diagonal basis by use of the similarity transform. Consider the overall structure of the DFT transformation in a diagonal basis for the 4×4 case:

$$W_{mn}\underset{a}{v}^n = \underset{a}{\sigma}\,\underset{a}{v}_m \Rightarrow \begin{pmatrix} \underset{1}{\sigma} & 0 & 0 & 0 \\ 0 & \underset{2}{\sigma} & 0 & 0 \\ 0 & 0 & \underset{3}{\sigma} & 0 \\ 0 & 0 & 0 & \underset{4}{\sigma} \end{pmatrix}\begin{pmatrix} f^{1'} \\ f^{2'} \\ f^{3'} \\ f^{4'} \end{pmatrix} = \begin{pmatrix} \underset{1}{\sigma}f^{1'} \\ \underset{2}{\sigma}f^{2'} \\ \underset{3}{\sigma}f^{3'} \\ \underset{4}{\sigma}f^{4'} \end{pmatrix} = \underset{a}{\sigma}\begin{pmatrix} F_{1'} \\ F_{2'} \\ F_{3'} \\ F_{4'} \end{pmatrix},$$

where the primes on indices denote the data and its transform in the diagonal basis as discussed further below. The Fourier transform pair can be co-linear when calculated in the diagonal basis:

$$\begin{pmatrix} F_{1'} \\ F_{2'} \\ F_{3'} \\ F_{4'} \end{pmatrix} = \begin{pmatrix} (\sigma_1/\sigma_a)f^{1'} \\ (\sigma_2/\sigma_a)f^{2'} \\ (\sigma_3/\sigma_a)f^{3'} \\ (\sigma_4/\sigma_a)f^{4'} \end{pmatrix},$$

that differs only by a scalar factor. This example illustrates the geometrical significance of the DFT transform in a diagonal basis and motivates using the same kernel symbol for the Fourier transform pair, since the quantities are co-linear. This difference in notation can be contrasted with the approach taken so far where the kernel symbols have been kept distinct, and the $W^m{}_n$ transformation was regarded as a point transformation.

In some embodiments, the metric tensor can be used to show that the eigen-problem can be equivalently expressed in the form:

$$\left(W_{\overline{m}n} - \sigma_a a_{\overline{m}n}\right)v_a^n = 0,$$

or also as:

$$\left(W^m{}_{.n} - \sigma_a \delta^m{}_{.n}\right)v_a^n = 0.$$

The eigen-problem does not have to depend on a specific choice for the metric. Solving the eigenvalues for the $W^m{}_n$ can be done by the following MATLAB® function:

$$\det\left(W^m{}_{.n} - \sigma_a \delta^m{}_{.n}\right) = 0.$$

Eigen-Problem for the DFT Matrix

According to various embodiments, it is known in the art that because $$W^4 = I,$$

the eigenvalues for the DFT matrix for N>3 are non-unique and are multiples of the so-called "roots of unity":

$$\sigma_a = e^{i\pi a/2}; a = 1, \ldots, 4; \Rightarrow \sigma_a \in \{\pm 1, \pm i\}.$$

Specifically, the eigenvalues become:

$$\sigma_1 = 1, \sigma_2 = -1, \sigma_3 = i, \sigma_4 = -i.$$

The eigenvalues of the DFT transform are not all distinct for $N \leq 4$, so there are many possible sets of eigenvectors satisfying the eigen-problem. As a consequence of having these non-unique eigenvalues, the corresponding eigenvectors for these degenerate eigenvalues are not necessarily orthogonal. The Gramm-Schmidt procedure as described in G. B. Arfken and H. J. Weber, "Mathematical Methods for Physicists," Academic Press, 6$^{th}$. Ed., 2005, pp. 642-649, which is incorporated herein in its entirety by reference, can be applied, or an orthogonal set can be obtained using the procedure described in R. Yarlagadda, "A note on the eigenvectors of DFT matrices," IEEE Trans. Acoust., Speech, Signal Processing, Vol. ASSP-25, pp. 586-589, 1977, which is incorporated herein in its entirety by reference.

Eigenvalues

In some embodiments, for example, M=N=4, the DFT transform and its inverse can be represented as:

$$W^m_k = \frac{1}{2}\begin{pmatrix} 1 & 1 & 1 & 1 \\ 1 & -i & -1 & i \\ 1 & -1 & 1 & -1 \\ 1 & i & -1 & -i \end{pmatrix};$$

$$\overset{-1}{W^m_k} = \tilde{W}^m_k = \overline{W}^m_k = \frac{1}{2}\begin{pmatrix} 1 & 1 & 1 & 1 \\ 1 & i & -1 & -i \\ 1 & -1 & 1 & -1 \\ 1 & -i & -1 & i \end{pmatrix}.$$

The solution can be solved for by:

$$\det\left(W^m{}_{.n} - \sigma_a \delta^m{}_{.n}\right) = 0,$$

after doing so, the 4×4 example has the solution of:

$$\left(\sigma_a - 1\right)^2\left(\sigma_a + 1\right)\left(\sigma_a + i\right) = 0 \Rightarrow \left\{\sigma_1 = 1, \sigma_2 = -1, \sigma_3 = 1, \sigma_4 = -i\right\},$$

with one degenerate eigenvalue, $$\sigma_1 = \sigma_3 = 1$$

Multiplicity of Eigenvalues for the DFT Matrix

As discussed above, the significance of $W^4=I$, for the DFT eigenvalue problem can be that degenerate eigenvalues appear for $N \geq 4$. The multiplicities of these eigenvalues are defined as the number of times each eigenvalue appears. For the 4×4 example, the result is $$m_1=2, m_2=1, m_3=1, m_4=0,$$

where the $M_k$ ordering corresponds to the ordering of the eigenvalues. These results can be generalized to higher dimensions as shown in the following Table of multiplicities for each eigenvalue:

TABLE 1

Multiplicities for the DFT Matrix Eigenvalues

| M = N | $m_1$ for $\sigma_1 = 1$: | $m_2$ for $\sigma_2 = -1$: | $m_3$ for $\sigma_3 = i$: | $m_4$ for $\sigma_4 = -i$: |
|---|---|---|---|---|
| 4m | m + 1 | m | m | m − 1 |
| 4m + 1 | m + 1 | m | m | m |

TABLE 1-continued

Multiplicities for the DFT Matrix Eigenvalues

| M = N | $m_1$ for $\sigma_1 = 1$: | $m_2$ for $\sigma_2 = -1$: | $m_3$ for $\sigma_3 = i$: | $m_4$ for $\sigma_4 = -i$: |
|---|---|---|---|---|
| 4m + 2 | m + 1 | m + 1 | m | m |
| 4m + 3 | m + 1 | m + 1 | m + 1 | m |

The 4×4 matrix corresponds to the m=1 value in the top row ($4_m$) of the table giving the multiplicities of eigenvalues listed. Similarly, it can be shown that for the 5×5 case, the eigenvalues comprise the following solution:

$$(\sigma_a - 1)^2 (\sigma_a + 1)(\sigma_a^2 + 1) = 0 \Rightarrow \{\sigma_1 = 1, \sigma_2 = -1, \sigma_3 = i, \sigma_4 = -i, \sigma_5 = 1\},$$

corresponding to the $2^{nd}$ row ($4_m+1$) of the Table with m=1, and M=N=4m+1. Substituting in the value of 1 for m, M=N=4(1)+1=5. Thus, the multiplicities for the 5×5 case are $$m_1 = 2, m_2 = 1, m_3 = 1, m_4 = 1.$$

In another example, say M=N=131=(4×32)+3, corresponding to the fourth row ($4_m+3$) of the Table giving the following multiplicities:

$$m_1 = 33, m_2 = 33, m_3 = 33, m_4 = 32.$$

Eigenvectors

According to various embodiments, given the eigenvalues, the eigenvectors corresponding to each eigenvalue can be constructed using the eigen-problem. It is instructive to consider this process for the eigenvectors corresponding to the degenerate first and third eigenvalues, $$\sigma_1 = \sigma_3 = 1.$$

The first eigenvector can be obtained as a solution to the set of linear equations:

$$\left(W_n^m - \sigma_a \delta_n^m\right) v_a^n \Big|_{a \to 1} = 0 \Rightarrow \begin{pmatrix} 1-\sigma_1 & 1 & 1 & 1 \\ 1 & -i-\sigma_1 & -1 & i \\ 1 & -1 & 1-\sigma_1 & -1 \\ 1 & i & -1 & -i-\sigma_1 \end{pmatrix} \begin{pmatrix} v_1^1 \\ v_1^2 \\ v_1^3 \\ v_1^4 \end{pmatrix} = \begin{pmatrix} 0 \\ 0 \\ 0 \\ 0 \end{pmatrix},$$

which can be simplified to the following:

$$\begin{pmatrix} -v_1^1 + v_1^2 + v_1^3 + v_1^4 \\ v_1^1 - (2+i)v_1^2 - v_1^3 iv_1^4 \\ v_1^1 - v_1^2 - v_1^3 - v_1^4 \\ v_1^1 + iv_1^2 - v_1^3 - (2+i)v_1^4 \end{pmatrix} = \begin{pmatrix} 0 \\ 0 \\ 0 \\ 0 \end{pmatrix}.$$

The solution for $v_1^n$ can be given in terms of two arbitrary components, for example, $v_1^3$ and $v_1^4$, thus leaving:

$$\left(v_1^1, v_1^2, v_1^3, v_1^4\right) = \left(v_1^3 + 2v_1^4, v_1^4, v_1^3, v_1^4\right).$$

In this example, two components can be used because of the two-fold degeneracy of the $$\sigma_1 = \sigma_3 = 1$$

eigenvalue. The eigenvectors corresponding to unique eigenvalues can be specified in terms of a single component. Values for $v_1^3$ and $v_1^4$ can be arbitrarily chosen, for example, $$v_1^4 = 1 \text{ and } v_1^3 = 0,$$

to obtain a realization for the first eigenvector:

$$\left(v_1^1, v_1^2, v_1^3, v_1^4\right) = \left(v_1^3 + 2v_1^4, v_1^4, v_1^3, v_1^4\right)\Big|_{\substack{v_1^4 \to 1 \\ v_1^3 \to 0}} \Rightarrow v_1^n$$

$$= (2, 1, 0, 1).$$

A solution for $v_3^n$ can be obtained by choosing complementary but arbitrary numerical values for the $v_1^3$ and $v_1^4$, for example, $$v_3^4 = 0 \text{ and } v_3^3 = 1:$$

$$\left(v_3^1, v_3^2, v_3^3, v_3^4\right) = \left(v_3^3 + 2v_3^4, v_3^4, v_3^3, v_3^4\right)\Big|_{\substack{v_1^4 \to 0 \\ v_1^3 \to 1}} \Rightarrow v_3^n$$

$$= (1, 0, 1, 0).$$

In some embodiments, the remaining eigenvectors that correspond to their eigenvalues, $$\sigma_2 = -1 \text{ and } \sigma_4 = -i,$$

can be solved for. An exemplary set of eigenvectors (but not the only set) for the 4×4 DFT as transformation can be represented as:

$$v_1^n = \begin{pmatrix} 2 \\ 1 \\ 0 \\ 1 \end{pmatrix}, v_2^n = \begin{pmatrix} -1 \\ 1 \\ 1 \\ 1 \end{pmatrix}, v_3^n = \begin{pmatrix} 1 \\ 0 \\ 1 \\ 0 \end{pmatrix}, v_4^n = \begin{pmatrix} 0 \\ -1 \\ 0 \\ 1 \end{pmatrix}.$$

According to various embodiments, because two of the eigenvalues are degenerate, neither the eigenvector $v_1{}^n$, or the set of eigenvectors $v_1{}^n$-$v_4{}^n$, form an orthogonal system that can be verified by forming the inner product between any two vectors using the base solution, $$a_{1\bar{k}1} \stackrel{?}{=} \delta_{\bar{k}1},$$

where the off-diagonal entries correspond to the $$\sigma_1 = \sigma_3 = 1$$

value. For reference, we can construct an orthonormal set from the set of eigenvectors:

$$u_1^n = \frac{1}{\sqrt{6}}\begin{pmatrix} 2 \\ 1 \\ 0 \\ 1 \end{pmatrix}, u_2^n = -\frac{1}{2}\begin{pmatrix} -1 \\ 1 \\ 1 \\ 1 \end{pmatrix}, u_3^n = \frac{1}{2\sqrt{3}}\begin{pmatrix} 1 \\ -1 \\ 3 \\ -1 \end{pmatrix}, u_4^n = \frac{1}{\sqrt{2}}\begin{pmatrix} 0 \\ -1 \\ 0 \\ 1 \end{pmatrix}.$$

and verify that $$\delta_{\bar{k}\bar{l}} \bar{u}_m^{\bar{k}} u_n^{\bar{l}} = \delta_{mn}.$$

Similarity Transform

Given the eigenvectors, one can form the similarity transform using the eigenvectors as columns. This can be denoted as a transformation of basis such that one can find by construction that the similarity transform, $S_m{}^{m'}$, and its inverse, $\overset{-1}{S}{}_m^{m'}$ can be given by:

$$S_m^{m'} = \begin{pmatrix} 2 & -1 & 1 & 0 \\ 1 & 1 & 0 & -1 \\ 0 & 1 & 1 & 0 \\ 1 & 1 & 0 & 1 \end{pmatrix};$$

-continued $$\overset{-1}{S}{}_m^{m'} = \frac{1}{4}\begin{pmatrix} 1 & 1 & -1 & 1 \\ -1 & 1 & 1 & 1 \\ 1 & -1 & 3 & -1 \\ 0 & -2 & 0 & 2 \end{pmatrix}.$$

It can then be verified that applying the similarity transformation to the $W^m{}_n$ gives:

$$SWS^{-1} \equiv S_m^{m'} W_n^m \overset{-1}{S}{}_{n'}^{n} $$
$$= W_{n'}^{m'}$$
$$= \begin{pmatrix} \sigma_1 & 0 & 0 & 0 \\ 0 & \sigma_2 & 0 & 0 \\ 0 & 0 & \sigma_3 & 0 \\ 0 & 0 & 0 & \sigma_4 \end{pmatrix}$$
$$= \begin{pmatrix} 1 & 0 & 0 & 0 \\ 0 & -1 & 0 & 0 \\ 0 & 0 & 1 & 0 \\ 0 & 0 & 0 & -i \end{pmatrix}.$$

As a check on index ordering one can run the following line of Mathematica code with Si defined as the inverse of the S: Exemplary code is listed below.

Table[Sum[S[[m, ump]] W[[m, n]] Si[[lnp, n]], {n, 1, M}, {m, 1, M}], {ump, 1, M}, {lnp, 1, M}]

where ump denote "upper-m-prime" and lnp is "lower-m-prime." The similarity transform can be constructed using the orthonormal eigenvectors as columns. Where the similarity transform leaves the $W^m{}_n$ in diagonal form, many possible choices can be made for the $S_n{}^{m'}$. As indicated by calculations thus far, it does not seem to matter whether or not the eigenvectors forming the $S_n{}^{m'}$ are orthogonal, and this can greatly simplify the initial calculations needed for calculating in the diagonal basis.

DFT Calculation in Diagonal Form

According to various embodiments, the diagonal form of the DFT can allow the DFT calculation to be performed as simply a multiplication of the entries on the main diagonal (the eigenvalues), to the corresponding data components that have been pre-multiplied using the similarity matrix. This means that after pre-multiplying the data, the DFT transform can be reduced to a vector product consisting of N operations rather than a matrix multiplied with $N^2$ operations when the Fourier transform is used, or N log N operations as is the case when a fast Fourier transform ("FFT") is used. This can result in a reduction in computation time and cost. In some embodiments, the diagonal DFT representation can lead to a fast calculation for one part of the DFT operation, but this gain can be offset by the added computational cost of having to pre-transform the data and then back-transform to bring the Fourier transform into the original basis. In some embodiments, however, these latter operations need not be performed at every step in an iterative transform application, such as, for example, in a phase retrieval operation.

According to various embodiments, once the notation of the DFT calculation in the diagonal basis has been switched back to distinct kernel symbols for the data and its transform, the DFT can be represented as:

$$F^{m'} = W^{m'}{}_{n'} f^{n'},$$

where the m' represents the transformation of basis under the action of the similarity transform. The only non-zero values for the $W^m{}_n$ are along the diagonal, therefore, one can form a vector, $\sigma_{m'}$ from the eigenvalues, for example, from the diagonal entries of the $W^m{}_n$. Continuing with the calculation of the starting data, $f_k$, can be pre-transformed or pre-multiplied using the inverse similarity transform $\bar{S}^{-1}{}_n^{n'}$, to give $$f^{n'} = \bar{S}^{-1}{}_n^{n'} f^n.$$

The diagonal DFT can then be the product of the N components of the $\sigma_{m'}$ and the $f_{n'}$ defined, as shown:

$$\boxed{F^{m'} = \sigma_{m'} \cdot f_{m'}},$$

where no sum is implied over the (m', m') pair. To complete the calculation, the "diagonal" DFT components can be transformed back to the original DFT basis, $F^m$. To obtain this result one can express the left hand side of the DFT calculation in the diagonal basis in terms of components in the original basis:

$$F^{m'} = \bar{S}^{-1}{}_m^{m'} F^m.$$

Therefore, the original Fourier transform components can be obtained by back-transforming using the similarity transform, and be represented as:

$$F^n = S^n{}_{n'} F^{n'} = S^n{}_{n'} \bar{S}^{-1}{}_m^{n'} F^m = \delta^n_m F^m.$$

The inverse DFT can be calculated in a diagonal basis because the inverse of a diagonal matrix can be found by populating its diagonal entries with the inverse of the individual components. Therefore, given the $W^m{}_n$, the inverse can be (no sum is implied on the right hand side over the (m', m') pair):

$$\bar{W}^{-1}{}_{n'}^{m'} = \left(1 \Big/ \sigma_{m'}\right) \delta^{m'}_{n'},$$

and then inverse DFT transformation in the diagonal basis can be represented as:

$$\left(1 \Big/ \sigma_{m'}\right) \cdot F^{m'} = \left(1 \Big/ \sigma_{m'}\right) \cdot \sigma_{m'} \cdot f^{m'} = f^{m'}.$$

According to various embodiments, where it is feasible to perform the DFT in a diagonal basis, the similarity transform and its inverse can be pre-calculated. The multiplication of the similarity transform with the data can also be pre-calculated. Then, at an appropriate point, the DFT results can be transformed back to the original basis using the inverse similarity transform, preferably at the end of an iterative loop. An exemplary algorithm approach can comprise the method illustrated in FIG. 1.

Figure 1:
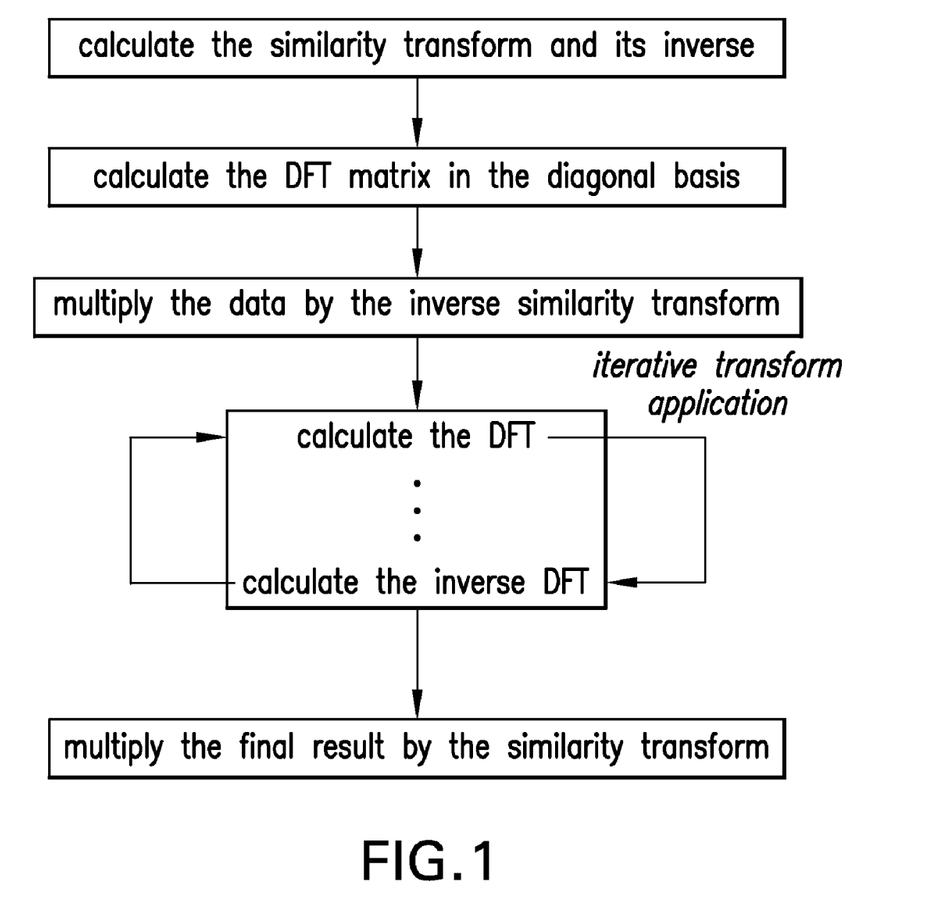
FIG. 1 is a flow chart showing a DFT calculation method, according to various embodiments of the present teachings.

As shown in FIG. 1, in a first step, the similarity transform and the inverse similarity transform can be pre-calculated. In a second step, the diagonal form of the DFT matrix can be calculated in a third step wherein a data set can be pre-transformed by multiplying the data by the inverse similarity transform. In a fourth step, the DFT and the inverse DFT can be calculated for a set of data. This fourth step can be for an iterative transform application, for example, phase retrieval. The fourth step can loop a desired number of times, for example, a fixed number of times set by a user.

Figure 2:
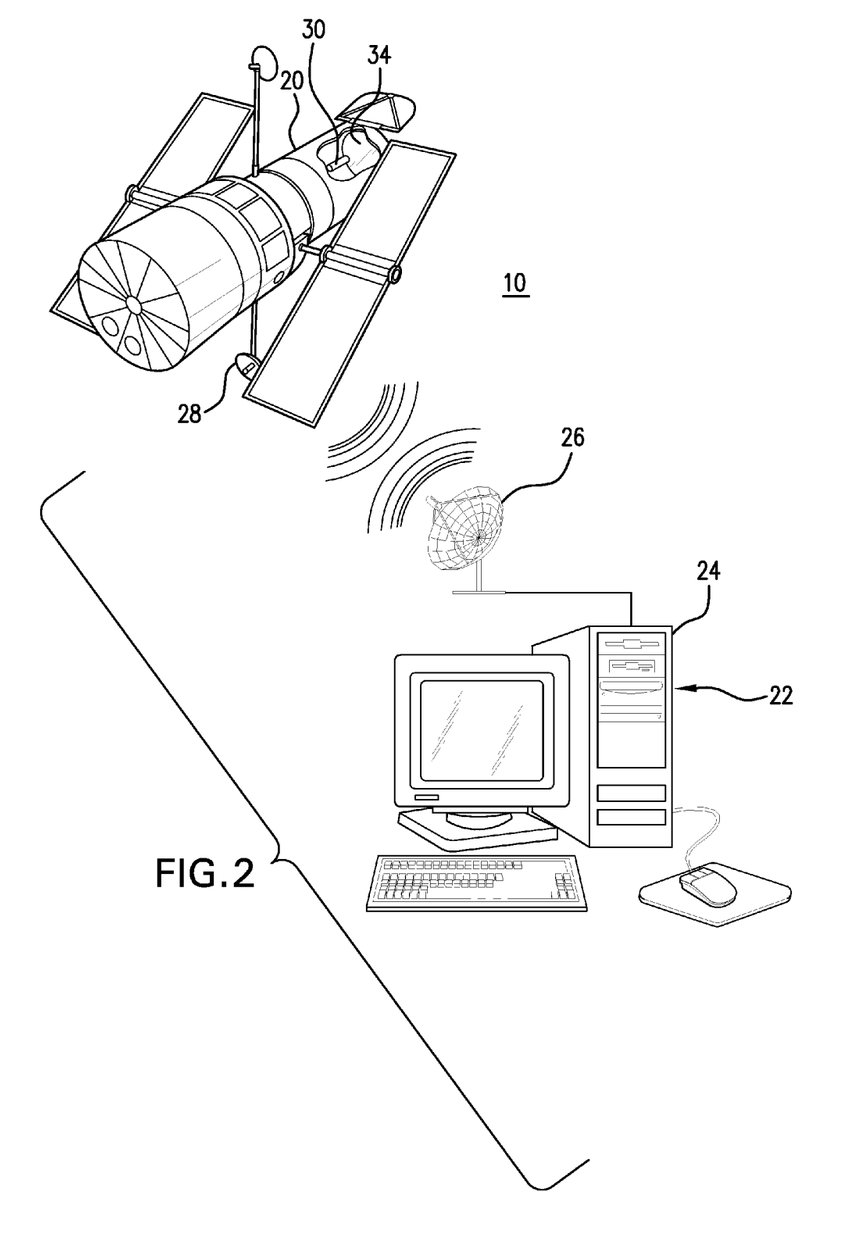
FIG. 2 is an illustration of an optical system comprising a telescope in communication with a signal processor, according to various embodiments of the present teachings.

FIG. 2 illustrates an example of an optical system 10 comprising a telescope 20 and a control unit 22. Telescope 20 can comprise one or more optical components, for example, at least one mirror, lens, servo mechanism, prism, beam splitter, photomultiplier tube, detector, camera, or combination thereof. In the embodiment shown, telescope 20 can comprise a lens 34. Telescope 20 can be configured to be launched from the ground into the earth's atmosphere. Telescope 20 can be configured to orbit the earth. Control unit 22 can comprise a signal processor 24. Signal processor 24 can be configured to carry out one or more of the algorithms of the present teachings. In some embodiments, one or more of the algorithms of the present teachings can be coded in software that can be processed by signal processor 24. Control unit 22 can be configured to control at least one of the one or more optical components of the telescope 20, for example, lens 34, through a wireless communication. In some embodiments, control unit 22 can also comprise a land-based transmitter/receiver 26, and a space-based transmitter/receiver 28. Signals transmitted by transmitter/receiver 26 can be received by transmitter/receiver 28 and used by control mechanics 30 in telescope 20, to control movement of lens 34. Control mechanics 30 can comprise appropriate motors, linkages, and gears to effect fine movement of lens 34.

According to various embodiments, the algorithms described herein can be used with any desired signal processing application where a transfer of data between the spatial domain and the frequency domain is used, or vice versa. For example, the methods provided herein can be used with a hybrid diversity algorithm that is used to recover phase retrieval that has high spatial frequency. The methods provided herein can be used with a distributed transpose algorithm for a two-dimensional FFT on a cluster of digital signal processors. In some embodiments, the methods provided herein can be used with matrix DFTs for fast phase retrieval. The methods herein can be used with space telescope wavefront sensing software, for example, the software used with NASA's James Webb Space Telescope. In some embodiments, the methods provided herein can be used with hybrid diversity methods that utilize an adaptive diversity function as described in U.S. patent application Ser. No. 11/469,105, filed Aug. 31, 2006, to Dean, which is incorporated herein in its entirety by reference. The methods of the present teachings can also be incorporated with various digital signal processing applications for example, algorithms using the Nyquist-Shannon sampling theorem or variations thereof, algorithms that provide optimal padding for two-dimensional FFTs, and hybrid architecture active wavefront sensing and control.

EXAMPLE

The steps above are illustrated for a 4×4 example. Consider the general complex data vector:

$$f_n = (z^1, z^2, z^3, z^4).$$

The inverse similarity transform times the data vector is given by:

$$f^{m'} = \overset{-1}{S}{}^{m'}_m f^m = \frac{1}{4}\begin{pmatrix} z_1 + z_2 - z_3 + z_4 \\ -z_1 + z_2 + z_3 + z_4 \\ z_1 - z_2 + 3z_3 - z_4 \\ 2(-z_2 + z_4) \end{pmatrix},$$

$$\underset{m'}{\sigma} = (1, -1, 1, -i).$$

The DFT in the transformed basis is followed by multiplication of the eigenvalues with the $f^{m'}$ composition to give the Fourier transform in the diagonal basis:

$$F^{m'} = \underset{m'}{\sigma} \cdot f^{m'} = \frac{1}{4}\begin{pmatrix} z_1 + z_2 - z_3 + z_4 \\ z_1 - z_2 - z_3 - z_4 \\ z_1 - z_2 + 3z_3 - z_4 \\ -2i(-z_2 + z_4) \end{pmatrix}.$$

Finally, the $f^{m'}$ components can be back-transformed by multiplying with the similarity transformation to give the DFT result in the original non-diagonal basis:

$$F^m = S^m_{m'} F^{m'}$$
$$= \begin{pmatrix} 2 & -1 & 1 & 0 \\ 1 & 1 & 0 & -1 \\ 0 & 1 & 1 & 0 \\ 1 & 1 & 0 & 1 \end{pmatrix} \frac{1}{4}\begin{pmatrix} z_1 + z_2 - z_3 + z_4 \\ z_1 - z_2 - z_3 - z_4 \\ z_1 - z_2 + 3z_3 - z_4 \\ -2i(-z_2 + z_4) \end{pmatrix}$$
$$= \frac{1}{2}\begin{pmatrix} z^1 + z^2 + z^3 + z^4 \\ z^1 - iz^2 - z^3 + iz^4 \\ z^1 - z^2 + z^3 - z^4 \\ z^1 + iz^2 - z^3 - iz^4 \end{pmatrix},$$

in agreement with the original DFT transform, $F^m = W^m_n f^n$.

According to various embodiments, the diagonal form of the DFT can illustrate that the DFT calculation can be performed as a vector product. This means that the DFT can be reduced to N multiplications of the data with the eigenvalues. Certain signal processing applications spend a majority of their time in the forward and inverse transforms part of the calculations (see FIG. 1). For signal processing applications where the initial and final data transformations are needed only once, the subsequent DFT calculations can proceed as simply N multiplications of the entries along the main diagonal. The performance gain for a single DFT calculation can then be approximately log (N) time faster with respect to the FFT. For example, assuming for simplicity a power of 2 for the data size ($N=2^n$), we can estimate a performance improvement for large n to be n log $(2)=10^1$, or about an order of magnitude faster then the equivalent FFT calculation, and for arbitrary frequency spacing.

Other embodiments will be apparent to those skilled in the art from consideration of the present specification and practice of various embodiments disclosed herein. It is intended that the present specification and example be considered as exemplary only.

What is claimed is:

1. A method for determining aberration data for an optical system, the method comprising:
   providing an optical system comprising a signal processor;
   collecting intensity data generated by the optical system;
   calculating a similarity transform and an inverse of the similarity transform, based on the collected intensity data;
   calculating a discrete Fourier transform matrix in a diagonal basis, based on the collected intensity data;
   pre-transforming the collected intensity data using the processor, by multiplying the collected intensity data by one of the similarity transform and the inverse of the similarity transform, to generate pre-transformed data;
   performing an iterative transform operation on the pre-transformed data using the processor, by multiplying the pre-transformed data by the discrete Fourier transform matrix, a predetermined amount of times, to generate iteratively transformed data;
   back-transforming the iteratively transformed data using the processor, by multiplying the iteratively transformed data by one of the similarity transform and the inverse of the similarity transform, to form aberration data, wherein the iteratively transformed data is multiplied by the similarity transform when the intensity data is multiplied by the inverse of the similarity transform in the pre-transforming step, and the iteratively transformed data is multiplied by the inverse of the similarity transform when the intensity data is multiplied by the similarity transform in the pre-transforming step; and
   outputting the aberration data to a user.

2. The method of claim 1, wherein the method further comprises generating correction data based upon the aberration data, and adjusting the optical system using the correction data.

3. The method of claim 1, wherein the outputting comprises displaying the aberration data to the user.

4. The method of claim 1, wherein the optical system further comprises a control unit and a telescope, the telescope comprises one or more optical components, at least one of the one or more optical components is configured to move, and the control unit is configured to control the movement of at least one of the optical components.

5. The method of claim 4, wherein the one or more optical components comprise at least one mirror, lens, servo mechanism, prism, beam splitter, photomultiplier tube, detector, or a combination thereof.

6. The method of claim 4, wherein the signal processor is operably linked to the control unit.

7. The method of claim 1, wherein the optical system further comprises a space telescope.

8. The method of claim 1, wherein the aberration data pertains to at least one of a piston aberration, a tip aberration, a tilt aberration, a defocus aberration, an astigmatism aberration, a coma aberration, a spherical aberration, and a trefoil aberration.

9. The method of claim 1, wherein the iterative transform operation comprises iteratively performing a phase retrieval operation on the pre-transformed data.

10. The method of claim 9, wherein the method further comprises generating phase correction data, and the method further comprises adjusting the optical system using the phase correction data.

11. The method of claim 1, further comprising launching the optical system into space prior to the collecting intensity data generated by the optical system.

12. An optical system comprising a signal processor and a control unit, the control unit being operably linked to the signal processor, wherein the signal processor is configured to perform a method comprising:

collecting intensity data generated by the optical system;

calculating a similarity transform and an inverse of the similarity transform, based on the collected intensity data;

calculating a discrete Fourier transform matrix in a diagonal basis, based on the collected intensity data;

pre-transforming the collected intensity data using the processor, by multiplying the collected intensity data by one of the similarity transform and the inverse of the similarity transform, to generate pre-transformed data;

performing an iterative transform operation on the pre-transformed data using the processor, by multiplying the pre-transformed data by the discrete Fourier transform matrix, a predetermined amount of times, to generate iteratively transformed data;

back-transforming the iteratively transformed data using the processor, by multiplying the iteratively transformed data by one of the similarity transform and the inverse of the similarity transform, to form aberration data, wherein the iteratively transformed data is multiplied by the similarity transform when the intensity data is multiplied by the inverse of the similarity transform in the pre-transforming step, and the iteratively transformed data is multiplied by the inverse of the similarity transform when the intensity data is multiplied by the similarity transform in the pre-transforming step; and outputting the aberration data to a user.

13. The optical system of claim 12, wherein the signal processor is further configured to generate correction data based upon the aberration data.

14. The optical system of claim 13, wherein the control unit is configured to adjust the optical system based upon the correction data.

15. The optical system of claim 12, further comprising a telescope, wherein the telescope comprises one or more optical components.

16. The optical system of claim 15, wherein the one or more optical components comprise at least one of a mirror, lens, servo mechanism, prism, beam splitter, photomultiplier tube, detector, or and combination thereof.

17. The optical system of claim 12, wherein the optical system comprises a focusing system.

18. The optical system of claim 12, wherein the optical system comprises a beam-generating device and a sighting system for the beam generating device.

* * * * *